(No Model.)
F. M. UNDERWOOD.
COMPOUND FOR AND METHOD OF PRESERVING EGGS.
No. 520,549.          Patented May 29, 1894.
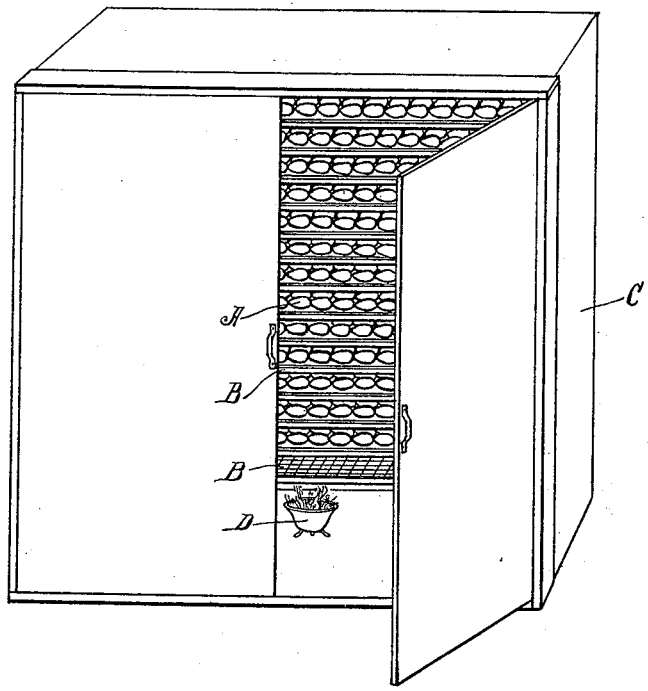
Witnesses.
O. W. Harbeson.
F. M. Townsend.
Inventor.
Francis M. Underwood
by Hazard & Townsend
his attys
THE NATIONAL LITHOGRAPHING COMPANY,
WASHINGTON, D. C.

UNITED STATES PATENT OFFICE.

FRANCIS M. UNDERWOOD, OF PASADENA, CALIFORNIA.

COMPOUND FOR AND METHOD OF PRESERVING EGGS.

SPECIFICATION forming part of Letters Patent No. 520,549, dated May 29, 1894.

Application filed March 5, 1894. Serial No. 502,327. (No specimens.)

*To all whom it may concern:*

Be it known that I, FRANCIS M. UNDERWOOD, a citizen of the United States, residing at Pasadena, in the county of Los Angeles and State of California, have invented a new and useful Compound for and Method of Preserving Eggs, of which the following is a specification.

The object of my invention is to produce a compound for and method of preserving eggs whereby the eggs may be kept for an indefinite length of time without any apparent alteration in their character, and which will be of slight cost and simple in its application.

The accompanying drawing illustrates my invention, and is a front elevation of a fumigating apartment showing eggs in place therein and some of my improved compound being burned below.

My improved compound for preserving eggs consists of nitrate of strontium, oil of eucalyptus and cassia bark in substantially the following proportions: nitrate of strontium eight ounces; oil of eucalyptus two drams; pulverized cassia bark one pound. The ingredients are thoroughly mixed together and are then ready for use.

My improved method of preserving eggs consists of subjecting the eggs to the vapor or fumes arising from the combustion of nitrate of strontium, oil of eucalyptus and cassia bark.

In practical use the eggs, A, are arranged upon a suitable perforated tray, B, which are placed in an air tight apartment or fumigating room, C. For treating from twenty to one hundred dozen eggs I take about two ounces of the compound described above which I place in a suitable receptacle, D, in the apartment C, and set the compound on fire. The apartment is then tightly closed and is left closed for about two hours, after which the eggs may be removed and stored in any suitable place. I find in practice that they will keep perfectly for six months or more, there being no change in the appearance of the white or the yelk, and the yelk does not adhere to the shell, which frequently happens where the eggs are preserved by other methods.

The oil of eucalyptus may be extracted from the leaf, or the natural eucalyptus leaf may be mixed with the compound but it is practically impossible to properly gage the amount of oil used if the oil is not extracted from the leaf. Although I prefer to employ the extracted oil in practicing my invention, still I do not limit my invention to the use of such extracted oil.

I find that in practice it is very essential that during the process of fumigation the temperature does not rise above 70° Fahrenheit, for if this occurs the eggs will very soon spoil.

Now, having described my invention, what I claim as new, and desire to secure by Letters Patent, is—

1. The improved compound for preserving eggs set forth, consisting of nitrate of strontium, oil of eucalyptus and pulverized cassia bark.

2. The improvement in the art of fumigating eggs which consists in subjecting the eggs to fumes or vapors arising from the combustion of nitrate of strontium, oil of eucalyptus and cassia bark.

FRANCIS M. UNDERWOOD.

Witnesses:
JAMES R. TOWNSEND,
F. M. TOWNSEND.